July 17, 1928.

L. T. TROLAND ET AL 1,677,309

REGISTERING AND CEMENTING CINEMATOGRAPHIC FILMS

Filed Sept. 15, 1921     4 Sheets-Sheet 1

Fig. 1.

Inventor
Leonard T. Troland
Joseph A. Ball
by Roberts, Roberts & Cushman
their Attorneys Patented July 17, 1928.

1,677,309

UNITED STATES PATENT OFFICE.

LEONARD T. TROLAND, OF MALDEN, AND JOSEPH A. BALL, OF WOLLASTON, MASSACHUSETTS, ASSIGNORS, BY MESNE ASSIGNMENTS, TO TECHNICOLOR MOTION PICTURE CORPORATION, OF BOSTON, MASSACHUSETTS, A CORPORATION OF MAINE.

REGISTERING AND CEMENTING CINEMATOGRAPHIC FILMS.

Application filed September 15, 1921. Serial No. 500,842.

This invention has to do with bringing cinematographic films, particularly complemental films, into registered juxtaposition or superposition and more particularly to securing such films together in accurate registration.

In the production of motion pictures it is frequently desirable to bring a plurality of films into juxtaposition with their sprocket holes or other registering means in accurate registration and, where the films bear latent or developed complemental images, with the images which are complemental to each other also in accurate registration. Examples of such desiderata are found in printing from one film upon another film where it is desired to have the printed images bear the same relation to their sprocket holes as the images on the printing film, also in imbibition processes where images are printed from a stained matrix upon a blank film, and in uniting complemental films together to build up a composite film in which the superposed images are colored differently. And in uniting films together there are difficulties in effecting the union rapidly and permanently.

The objects of the present invention are to overcome the aforesaid and other difficulties and to effect the aforesaid accurate registration rapidly and automatically.

We have attempted to bring films into registered superposition by means of driven rollers having intermeshing teeth and sockets, the teeth passing through the sprocket holes of the films and bringing the holes into more or less accurate registry as they pass between the rollers. However, we have found that registration may be attained more perfectly and more easily, and the machine will retain its prerequisite accuracy much longer, by employing rollers or other guide means having teeth which contact only with the films and not with sockets or other means on the opposite sides of the films, and which are advanced with the films by the films themselves, instead of being driven from a source of power and thence serving to advance the films.

In uniting films together we supply cement or adhesive to the films in limited quantity immediately before the films are pressed together, the quantity preferably being substantially sufficient to effect a strong union without excess. This limited quantity is distributed substantially uniformly over the film throughout the entire width thereof. The films are then pressed together with a pressure at least of the order of 100 pounds per square inch and preferably up to approximately 200 pounds per square inch.

We have discovered that a strong union (practically a weld) can be rapidly secured by employing a film solvent such as acetone and amyl alcohol, applying the solvent immediately before the films are pressed together, and restricting the application of the solvent to the amount which will wet the film surface substantially without excess. When employing a film solvent it is particularly important to press the films together quickly after the liquid is applied, preferably within approximately one-tenth of a second.

The invention comprises means for drawing films over and between pressure rolls. It further comprises means on the rolls which contact with the films as they are drawn thereover whereby the rolls are geared together and operated solely by the films. The invention further comprises adjustable means for pressing the rolls together to apply pressure to the films passing between them. The invention further comprises means for feeding and applying evenly to the films just before they pass between the rolls a thin solvent cement. It further comprises means for drawing the cement to the edges of the films and for removing the excess cement. It further comprises means for cleaning and drying the multiple film produced by the invention.

In order to illustrate the invention one concrete embodiment thereof is shown in the accompanying drawings in which,—

The particular embodiment of the invention chosen for the purpose of illustration comprises a base 15, and an upright support 16 provided with braces 17. The films to be united are supported upon reels 18 and 19, the shafts of which are mounted in suitable bearings 20 in brackets 21 and 22 near the top of upright 16. Near the base, in a suitable bearing 23, is a shaft 24 having keyed thereto a worm wheel 25 operated by a worm 26 on an angularly disposed shaft 27 operated through gearing 28 by a motor 29. Upon shaft 24 the take-up reel 30 is removably mounted by means of thumb screw 31, pins 32 projecting from worm wheel 25 to the usual openings in the film reel preventing slipping of the reel relative to the worm wheel.

The films a and b are threaded downwardly from their respective reels 18 and 19 under guide rollers 33 and 34 respectively, over and between pressure rolls 35 and 36 where the films are pressed into contact and united, issuing below as the multiple film ab which extends between cleaning pads 37 and 38, then between drying pads 39 and 40 over guide roller 41 and upon take-up reel 30 by which the films are drawn through the various parts of the machine just mentioned.

Figure 1:
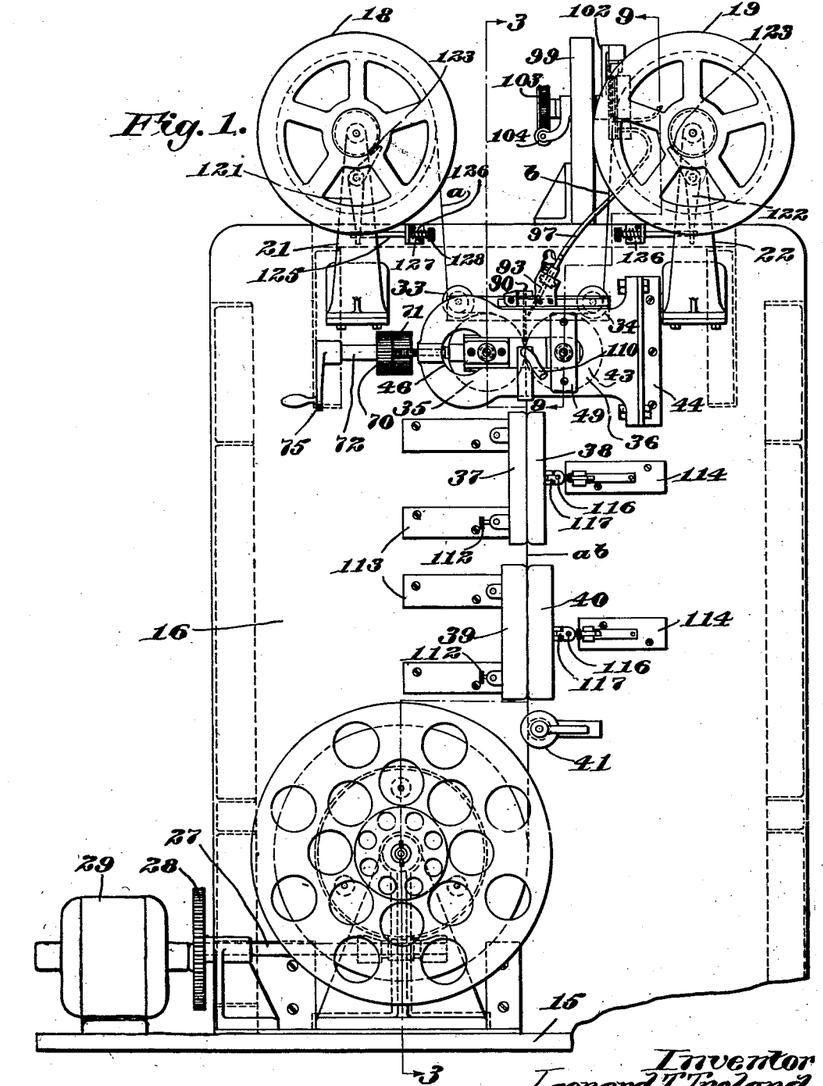
Fig. 1 is a front elevation of a device for uniting films.
Figures 2, 3:
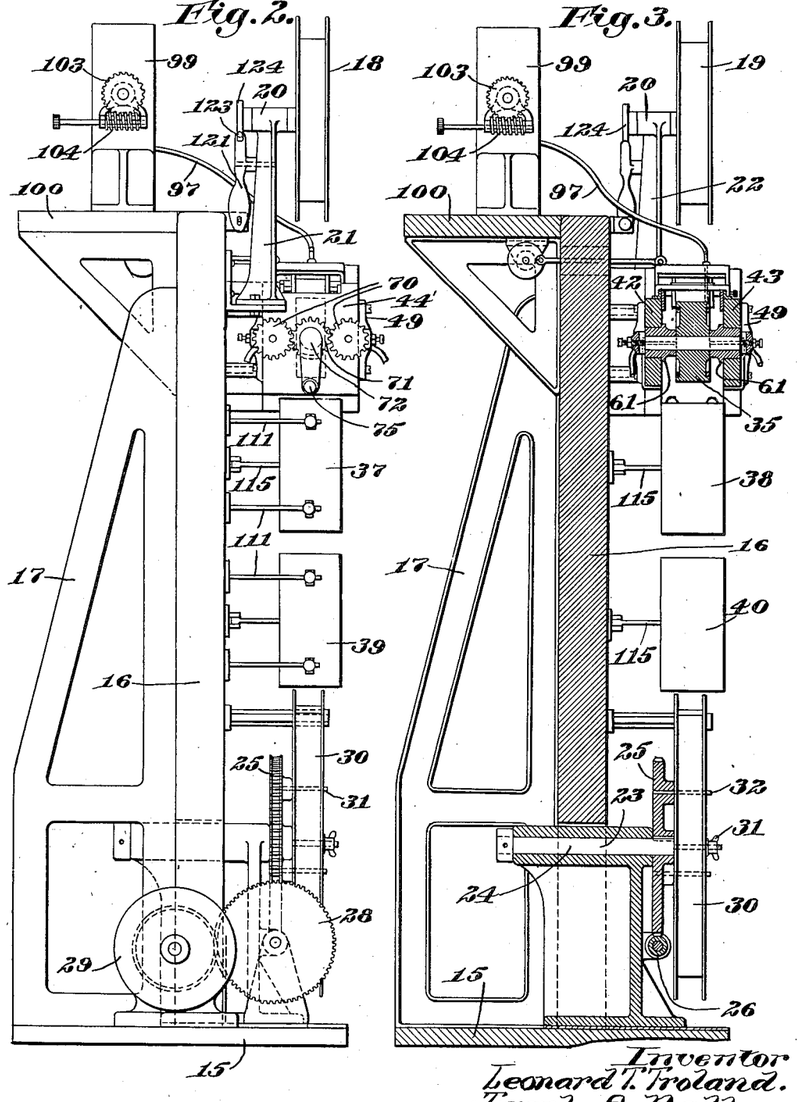
Fig. 2 is an end elevation thereof.
Fig. 3 is a vertical section on the line 3—3 of Fig. 1.
Figure 4:
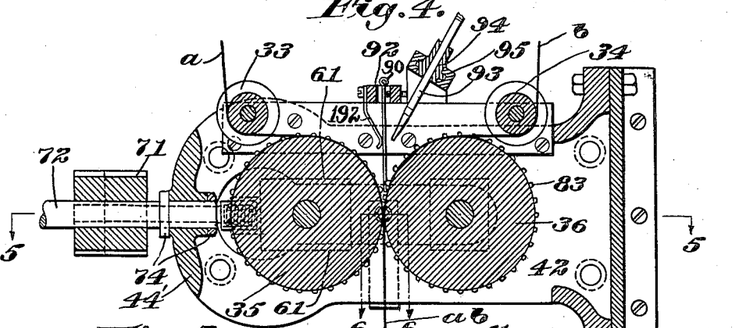
Fig. 4 is a vertical sectional detailed view on the line 4—4 of Fig. 5.

The pressure rolls 35 and 36, shown in detail in Figs. 4 to 8 inclusive, are supported between plates 42 and 43 disposed in parallelism to upright 16 to which they are attached by a projecting bracket 44. The plates 42 and 43 are joined at their free ends by an integral cross-head 44'. In the sides of plates 42 and 43 are broad slots 45 enlarged at one end into a circular opening 46 to facilitate the assembly of the pressure rolls within the plates. Pressure roll 36 is integral with its shaft 47 which is supported at either end by removable bearings 48 resting in slots 45. Across slots 45 on the outer sides of plates 42 and 43 extend spanner members 49 and 50 having screw bolts 51 contacting the ends of shaft 47 to adjust the same, the bolts being locked in adjusted position by nuts 52 thereon which bind against the spanned members. Pressure roll 35 is fast to shaft 53 which is journalled at either end in bearings 56 slidable in slots 45. Fastened to the outer ends of bearings 56 by means of bolts 57 are spanner members 58 having screw bolts 59, with locking nuts 60 thereon, for contacting the ends of shaft 53. Bearings 48 and 56 are squared for contact with slots 45 to prevent rotation of the bearings. Spanners 49 and 50 operate to hold pressure roll 36 axially in position. Spanners 58 upon the outer surfaces of bearings 56 permit adjustment of pressure roll 35 relative to the bearings which have shoulders 61 (Fig. 3) contacting the inner portions of plates 42 and 43 adjacent the slots 45. Pressure roll 35 is accordingly adjustable axially relative to roll 36 by means of screws 59 and is movable toward said roll by reason of the fact that neither its bearings nor its shaft is positively fastened to the side plates 42 and 43.

Means for applying pressure to bearings 56 of pressure roll 35 comprise oppositely threaded shafts 62 and 63 received in threaded openings 64 and 65 in cross-head 44'. The inner ends of the shafts 62 and 63 have socket members 66 telescoping into larger socket members 67 which contact with bearings 56. Pins 68 fastened in sockets 66 and sliding in grooves 69 of members 67 prevent relative rotation. Housed within the telescoping socket members 67 and 68 are coil springs 69. Shafts 62 and 63 are adapted to be rotated an equal amount in either direction through pinions 70 thereon in mesh with an elongate gear 71 on crank-shaft 72 held in a bearing 73 in cross-head 44' by collars 74. A crank handle 75 is attached to crank shaft 72 for conveniently operating the same.

Figure 5:
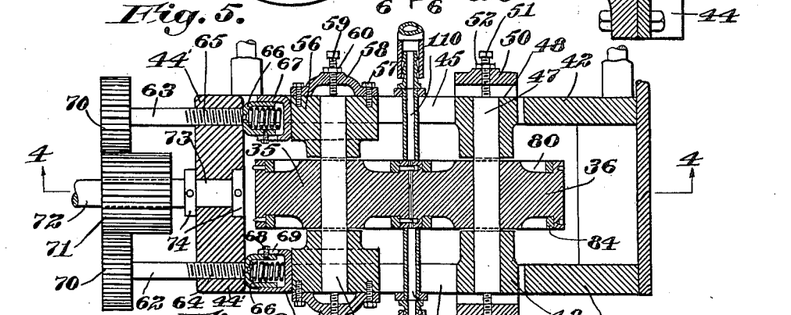
Fig. 5 is a horizontal section of the same elements taken on line 5—5 of Fig. 4.
Figures 6, 7, 8:
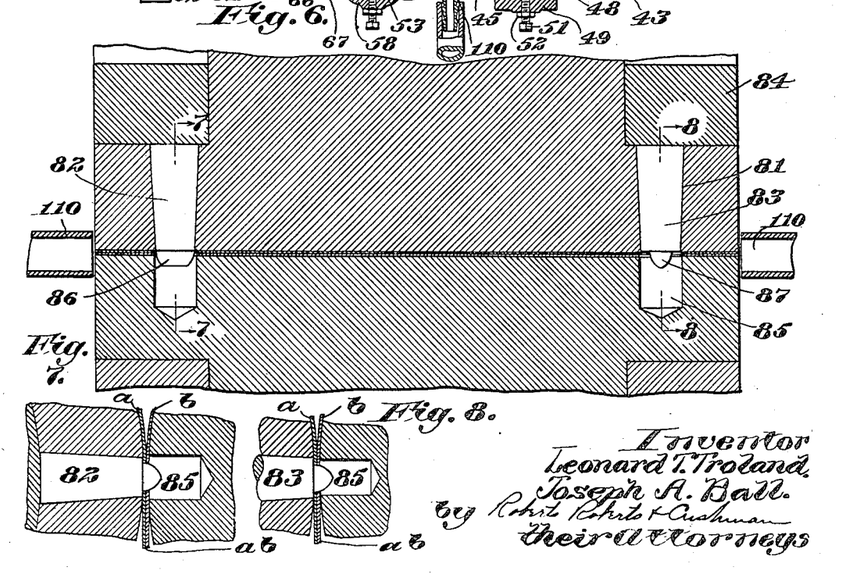
Fig. 6 is a sectional view, on a greatly enlarged scale, of the pressure rolls taken on the line 6—6 of Fig. 4.
Figs. 7 and 8 are enlarged sectional views of the registering pins and cooperating recesses taken on lines 7—7 and 8—8 respectively of Fig. 6.

The pressure rolls 35 and 36 have undercut surfaces defining circular grooves 80 (Figs. 5 and 6). The projecting portions of the rims left by the undercuts have tapering bores 81 extending into grooves 80 in which are housed removable registering pins 82 and 83. These pins are held in place by annular retaining rings 84 received in the circular grooves 80. Alternating with the tapered bores 81 around the periphery of the pressure rolls are shallow recesses 85 for receiving the projecting ends 86 and 87 of the registering pins 82 and 83 of the opposing roll. These recesses 85 are larger than the ends of the pins so that the pins do not engage the sockets at any time. The projecting ends 86 of pins 82 are tapered exactly to fit the sprocket holes of the films both longitudinally and transversely of the films. The projecting ends 87 of pins 83 are shaped exactly to fit the sprocket holes of the films longitudinally but not transversely of the films, thus affording clearance to take care of shrinkage or expansion transversely of the film.

The films $a$ and $b$ which are threaded over rolls 35 and 36 are positively pulled downward by the take-up reel 30. This pull of the films rotates pressure rolls 35 and 36 which are geared together by the films through the arrangement of the alternately disposed registering pins 82 and 83. But as stated above neither the rolls nor the registering pins carried thereby have any contact directly with each other.

Figures 9, 10, 11, 12, 13, 14, 15:
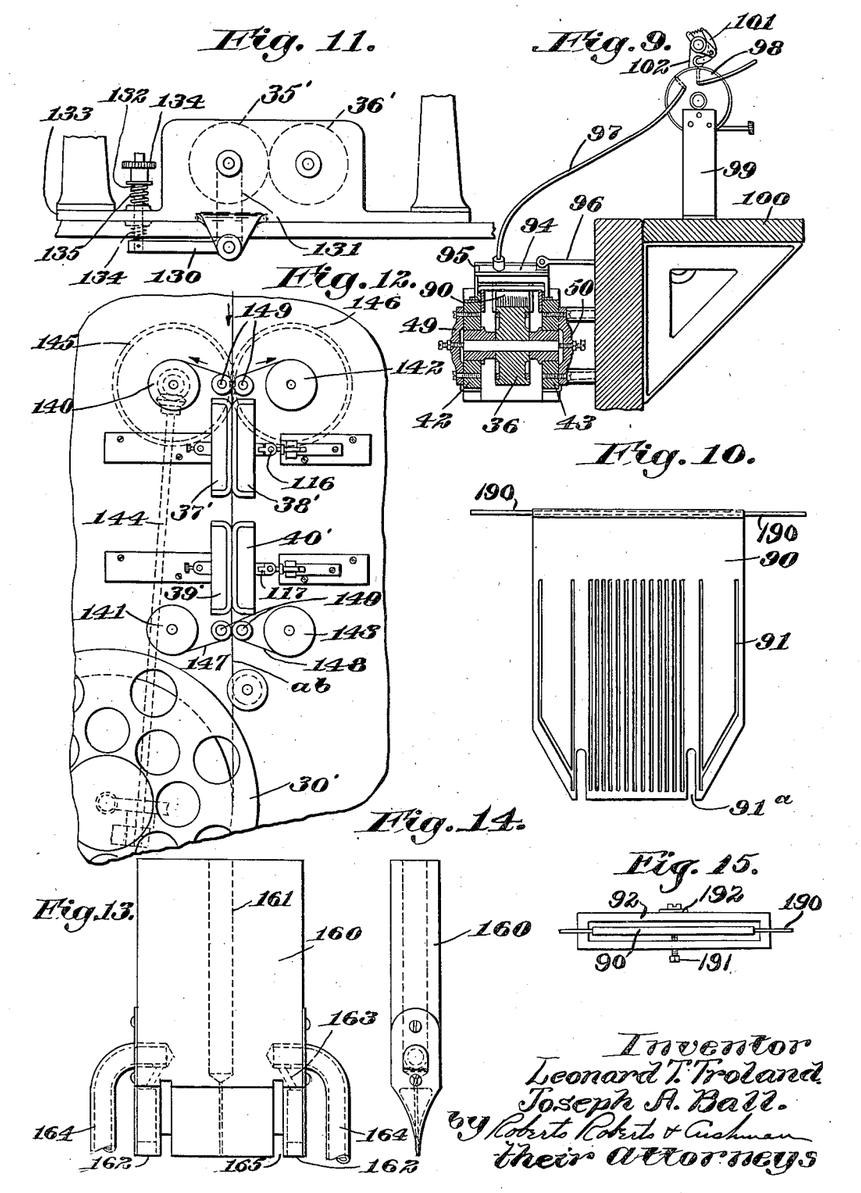
Fig. 9 is a vertical sectional view of another detail of the machine taken on line 9—9 of Fig. 1.
Fig. 10 is an elevational view of a distributor for the cement.
Fig. 11 is an elevational view of a modification of the means for controlling the pressure of the pressure rolls.
Fig. 12 is an elevational view showing a modified form of means for cleaning and drying the multiply film.
Figs. 13 and 14 are respectively a front elevation and an end elevation of a modified distributor for the cement.
Fig. 15 is a top view of the distributor plate and support therefor.

The means for applying cement to the films comprises a distributor plate 90, preferably of metal such as aluminum, provided with grooves 91 directing the flow of cement, the plate being suspended from a suitable support 92 so that its free end extends down between pressure rolls 35 and 36 into close proximity to the line of contact of films $a$ and $b$. Slots 91$^a$ are disposed opposite the sprocket holes of the films to permit passage of the registering teeth. A constant flow of cement is uniformly distributed over the surface of plate 90 by a nozzle 93 in reciprocating block 94 slidable in suitable guides 95 supported on plates 42 and 43 (Fig. 9). Means for reciprocating block 94 comprises an arm 96 pivoted to the block and operated from any suitable source of power, either through suitable connection with motor 29 or by an independent source of power.

An important feature of the invention consists in means for making the distributing plate self-aligning relatively to the films and for automatically holding the plate in proper position at all times. The preferred way of accomplishing this comprises supporting the plate 90 by means of a rod 190 fast to its upper end, the rod 190 resting on the support 92 at the ends of the slot provided therein for the distributor plate (Fig. 15). A screw 191 threaded through the support 92 engages the plate near the top approximately in its vertical central plane and a spring 192 mounted on the other side of the support engages the plate on the opposite side approximately at the center thereof. The spring is tensioned to hold the upper end of the plate against screw 191 and the lower end lightly against the film $b$. Thus the plate may pivot about the point of the screw and be self-aligning relatively to the line of contact with the film. The line engagement of the plate with the film spreads the cement uniformly thereover.

Cement is conducted to nozzle 93 by a flexible duct 97 from any suitable means for supplying a constant flow. A preferred means comprises a stationary drum 98 supported upon a bracket 99 extending from a bracketed shelf 100 on the upright support 16. The flexible duct 97 leads from a suitable reservoir (not shown) and makes several turns about the exterior of drum 98 before issuing from the drum and extending to the nozzle. The cement is forced out of pipe 97 in a continuous constant stream by means of a spring-pressed roller 101 which is carried around the exterior of the drum to progressively collapse duct 97 by means of its attachment to an arm 102 which is rotated by means of a worm wheel 103 keyed to the shaft of arm 102 and driven by worm 104 from any suitable source of power, but preferably from motor 29 so as to operate in synchronism with the film advancing means.

In order to insure distribution of the cement to the extreme edges of the films we preferably employ suction nozzles adjacent the edges of the films as shown at 110 in the drawings. These nozzles also function to remove any excess cement that may squeeze out at the edges, although it is important to avoid an excess of cement as above set forth.

To further insure against excess liquid being left on the outer surfaces of the film, as a result of leakage through the sprocket holes or around the edges of the films, we preferably provide cleaning pads as illustrated for example at 37—38 and 39—40. The first pair of pads 37—38 is preferably moistened with a cement solvent or remover such as benzol in which case the pads 39—40 serve to remove substantially the last traces of both cement and benzol. The pads 38 and 40 are carried on spring-pressed arms 116 whereby these pads may be swung away from pads 37 and 39 to thread the films into the machine. Joints 117 may be provided between the arms 116 and the pads to make the pads self-aligning.

In order to maintain a proper tension of the films as they are drawn through the machine, braking devices are provided for reels 18 and 19 comprising levers 121 and 122 pivotally mounted on brackets 21 and 22 respectively. The short arms of the levers are provided with brake shoes 123 contacting drums 124 keyed to the shafts of supporting reels 18 and 19 respectively. Adjustable tension is maintained on the longer ends of levers 121 and 122 by rods 125 pivotally attached to the levers respectively and slidably received in holes therefor in brackets 126 by the action of springs 127 held between brackets 126 and adjusting nuts 128.

Fig. 11 shows a modified arrangement for adjusting the pressure between the pressure rolls. In this figure roll 36′ is fixedly supported and roll 35′ is pressed thereagainst by an arrangement comprising a bell-crank 130, the vertical arm 131 of which is provided with bearings for roll 35′, the other arm of the lever being controlled by a rod 132 pivotally attached thereto and slidably received through a hole in supporting structure 133. Upon the outer end of rod 132 is a thumb nut 134 adapted to compress spring 135 against the support and thereby draw rod 132 upwardly against the tension of spring 134 disposed between arm 130 and base 133.

Fig. 12 shows a modified means for cleaning and drying the multiple film ab comprising reels 140, 141, 142 and 143 and rollers 149. Shaft 144 connects the shaft of reel 140 by suitable gearing to the driving means for take-up reel 30'. Suitable intermeshing gears 145 and 146 upon the shafts of reels 140 and 142 respectively transmit the drive from reel 140 directly to reel 142. These reels wind and draw upwardly from reels 141 and 143 respectively, strips of absorbent material 147 and 148. As the strips are drawn up on either side of film ab and in opposite direction to the movement of said film, they are pressed into intimate contact therewith by pressure pads 37', 38', 39' and 40' similar to correspondingly numbered pads in the form of the machine first described and similarly mounted. In this modified arrangement the multiple film as it issues from the pressure rollers is progressively cleaned by coming in contact with material which is at first somewhat soiled but becomes cleaner as the film progresses and finally opposite the lower guide rollers 149 is absolutely clean and fresh.

Figs. 13 and 14 show a modified type of distributor for the cement comprising a nozzle member or distributor 160 adapted to be disposed in the same position as distributor member 90 previously described. Distributor 160 has a supply duct 161 for the cement extending down through its center almost to the pointed end thereof. At the extreme edges of distributor 160 are suction nozzles 162, parallel to duct 161 and connected by ducts 163 to suction pipes 164. By the action of the suction tips or nozzles 162 the cement which is fed down duct 161 is spread out evenly across the extreme tip of distributor 160. Slots 165 are disposed opposite the sprocket holes in the films to prevent the feeding of cement into these holes. The edges of the films will be disposed opposite the nozzles 162 on distributor 160 and will be moistened by the cement sucked across slots 165 by these nozzles.

The operation of the device is as follows: Separate films are led downwardly simultaneously from reels 18 and 19 under guide rollers 33 and 34 which guide the films upon the upper surfaces of pressure rolls 35 and 36 with registering pins 82 and 83 passing through alternate sprocket holes in the films. The films are fed downwardly between the rolls into contact with each other, being disposed in accurate registration by the pins 82 and 83. Just prior to the time when the films are brought into contact with the pressure rolls, they receive from distributor 90 an even coating of cement which is drawn to the edge of the film by the suction nozzles. The pressure applied at this point by the pressure rolls is preferably about 200 pounds per square inch, and the surfaces of the films when softened by solvent cement are welded together under the high pressure of the rolls. The resulting multiple film issuing below the rolls is cleaned of excess cement on the edges and outer surfaces by benzol pads 37 and 38, and then dried by pads 39 and 40 before being rolled up upon the take-up reel 30. The rate at which the films are progressively advanced between the rolls is regulated so that the time elapsing between the application of the cement and the application of pressure is very short, preferably only approximately one-tenth of a second. The rate at which the cement is applied is preferably regulated so that the films receive only a thin coating which is insufficient to permeate deeply into the films. The cement may be applied to both films or it may be applied directly to only one film and thence to the other film when they contact. However, under most conditions it is preferable to apply the cement directly only to one film, especially when employing a celluloid-solvent cement. For example, in uniting films face to back with celluloid-solvent it is preferable to apply the cement to said back, thereby to render the back sufficiently adhesive to adhere to said face. Also in uniting films back to back with celluloid-solvent cement it is sometimes advantageous to apply the cement directly to only one film. In this way the other film remains stiffer owing to less softening by the solvent and thereby restrains the united films from buckling or otherwise distorting in the event that there is any such tendency.

The terms cement and adhesive are herein used to connote any substance which will unite two cinematographic films together either face-to-face, face-to-back or back-to-back, including a celluloid-solvent which is not an adhesive per se but which renders celluloid adhesive.

From the foregoing it will be evident that the cinematographic strips are potentially registered when respectively positioned on the pins of the two rollers and that by gearing the strips together, through the medium of the films or otherwise, the strips are in accurate registry when pressed together. Owing to the fact that the registering pins travel in closed orbits (circles in the illustrative embodiment) the process may be carried out continuously.

We claim:
1. Apparatus for bringing cinematographic strips into registered juxtaposition which comprises means for advancing the strips in juxtaposed relationship and means for registering the strips including registering pins recurrently entering the sprocket holes of the strips from opposite sides.

2. Apparatus for bringing cinematographic strips into registered juxtaposition which comprises means for advancing the strips in juxtaposed relationship and means for registering the strips including registering pins alternately entering the sprocket holes of the strips from opposite sides.

3. Apparatus for bringing cinematographic strips having sprocket holes into registered juxtaposition under pressure comprising means for advancing the strips in juxtaposed relationship, means for registering the strips with the spaces intermediate the sprocket holes on the different strips bearing like relations to each other including movable registering pins engaging the sprocket holes of the strips and wholly controlled in their movements by said strips, and means for subjecting said strips to pressure when properly registered.

4. Apparatus for bringing cinematographic strips having sprocket holes into registered juxtaposition and applying pressure thereto comprising means for advancing the strips in juxtaposed relationship, means for registering the strips with the spaces intermediate the sprocket holes on the different strips bearing like relations to each other including arcuately movable registering pins engageable with the sprocket holes of the strips and wholly controlled in their movements by said strips, and means for subjecting said strips to pressure when properly registered.

5. Apparatus for bringing cinematographic strips having sprocket holes into registered juxtaposition and subjecting them to pressure comprising means engageable with the sprocket holes in the strips for registering the latter and controlled by the strips, and means for applying pressure to said strips intermediate successive sprocket hole engaging means.

6. Apparatus for sticking two cinematographic strips together comprising means for continuously advancing the strips into registered contact, means for supplying a measured minute supply of liquid to the contacting surfaces of the strips, and means for positively actuating said two means in synchronism.

7. Apparatus for sticking two cinematographic strips together comprising means for continuously advancing the strips into registered juxtaposition, and a pump operating in synchronism with said means for metering a minute quantity of liquid to the contacting surfaces of said strips.

8. Apparatus for sticking two cinematographic strips together comprising means for continuously advancing the strips into registered juxtaposition, a distributor between said strips, and a pump operating in synchronism with said means for metering a minute quantity of liquid to said distributor.

9. Cinematographic apparatus comprising a plurality of rolls, means for drawing a plurality of cinematographic strips simultaneously between said rolls, and means upon said rolls for positioning said strips in exact superposition and for turning the rolls by the movement of said strips.

10. Cinematographic apparatus comprising a plurality of rolls, means for drawing a plurality of cinematographic strips simultaneously between said rolls, and means alternately disposed upon said rolls to project through the sprocket holes in said strips to accurately superpose the same, said last mentioned means serving to turn the rolls by the movement of the strips.

11. Cinematographic apparatus comprising a plurality of rolls, means drawing a plurality of cinematographic strips simultaneously between said rolls, and cooperating means upon said rolls and said strips whereby the rolls are turned by the movement of said strips.

12. Cinematographic apparatus comprising a pair of juxtaposed rolls, means for feeding cinematographic strips over the surface of said rolls and thereby into contact with each other, means for accurately registering the sprocket holes of the strips while on the rolls, and means for applying pressure to said rolls.

13. Cinematographic apparatus comprising a pair of juxtaposed rolls, means for feeding cinematographic strips over the surface of said rolls and thereby into contact with each other, means for accurately registering the sprocket holes of the strips while on the rolls, and adjustable means for applying pressure to said rolls.

14. Cinematographic apparatus comprising a pair of juxtaposed rolls, means for feeding cinematographic strips over the surface of said rolls and thereby into contact with each other, means for accurately registering the sprocket holes of the strips while on the rolls, and means for adjustably applying pressure to said rolls and permitting self-alinement of the same.

15. Cinematographic apparatus comprising a pair of juxtaposed rolls, pins alternately disposed on said rolls, means for drawing cinematographic strips over said rolls, said pins extending through the sprocket holes of said strips, whereby said rolls are turned by said strips, and means for applying pressure to said rolls.

16. Cinematographic apparatus comprising a pair of juxtaposed rolls, removable pins projecting through the rims of said rolls to extend into the sprocket holes of cinematographic strips disposed upon the surface of said rolls, and means retaining said pins in place.

17. Cinematographic apparatus comprising a pair of juxtaposed rolls, removable pins projecting through the rims of said rolls to extend into the sprocket holes of cinematographic strips extending over said rolls, and rings fitting in circular recesses in said rims to retain the pins in position.

18. Cinematographic apparatus comprising a pair of juxtaposed rolls, projections and recesses alternately disposed upon said rolls, the recesses being adapted to receive the projections of the opposed roll, means for drawing cinematographic strips over said rolls, said strips receiving the projections in their sprocket holes, and means for adjusting the rolls relatively to each other to dispose the strips in exact superposition.

19. Cinematographic apparatus comprising juxtaposed rolls, both of said rolls carrying registered means and one of said rolls being movable relative to the other, and means for applying pressure to the movable roll at its opposite ends.

20. Cinematographic apparatus comprising juxtaposed rolls carrying registering means, movable bearings for one roll, yieldable means for applying equal pressure to each of the movable bearings whereby the movable roll is self-alining relative to the opposing roll.

21. Cinematographic apparatus comprising juxtaposed film registering means having a cinematographic strip passage therebetween and having registering projections adapted to extend through registering openings in the strip, and means for adjusting said registering means relatively to each other parallel with the transverse dimensions of the strip.

22. Cinematographic apparatus comprising opposed rolls carrying registering means, one roll being fast on its shaft and having movable bearings, and adjustable means for said bearings whereby said rolls may be axially adjusted to dispose a cinematographic strip thereon in exact registry with a cinematographic strip on the opposing roll.

23. Cinematographic apparatus comprising opposed rolls carrying registering means, movable bearings for one of said rolls, adjustable means for forcing said bearings toward the opposing roll, and springs inserted between said adjustable means and said bearings to permit self-alinement of the movable roll.

24. Cinematographic apparatus comprising juxtaposed pressure members, means for feeding cinematographic strips between said members to be pressed into intimate contact thereby, means for accurately registering the sprocket holes of said strips, means for applying cement to the strips in advance of said members, and means for removing excess of said cement.

25. Cinematographic apparatus comprising juxtaposed pressure members, means for bringing together cinematographic strips between said members to be pressed into intimate contact thereby, means for applying cement to said strips, and means for drawing said cement to the edges of said strips.

26. Cinematographic apparatus comprising juxtaposed pressure members, means for bringing cinematographic strips together between said members to be pressed into intimate contact thereby, and means for applying cement to the strips including suction means for distributing the cement over the strips.

27. Cinematographic apparatus comprising juxtaposed pressure members, means for bringing cinematographic strips together between said members to be pressed into intimate contact thereby, means for applying cement to the strips including a distributor extending into the space between the films in advance of the region where the films contact, said distributor being arranged to direct the cement to opposite sides of the sprocket holes of the strips.

28. Cinematographic apparatus comprising juxtaposed pressure members, means for bringing cinematographic strips together between said members to be pressed into intimate contact thereby, and means for applying cement to the strips including a distributor having slots opposite the sprocket holes in the strips.

29. Cinematographic apparatus comprising means for applying a liquid to a cinematographic strip including a distributor for directing the liquid only to opposite sides of the sprocket holes of the strip, and means for producing relative movement between the strip and distributor.

30. Cinematographic apparatus comprising reels for films, a take-up reel, juxtaposed pressure members, means associated with said pressure members to cooperate with registering openings in the films to position the films between the pressure members, means for advancing the films from said first named reels between said pressure members to said take-up reel, means for applying cement to the films immediately before they are pressed together by said members, and means for cleaning said films after they have passed between said pressure members.

31. Cinematographic apparatus comprising reels for films, adjustable pressure rolls in line contact, means thereon to cooperate with the sprocket holes of the films to properly position the films, a take-up reel, means for actuating said take-up reel to advance films from said first-named reels over and between said pressure rolls to said take-up reel, a distributor for applying cement to the films immediately before they are brought together by the pressure rolls, and means for cleaning and drying the resulting multiply film.

32. Cinematographic apparatus comprising juxtaposed pressure members, means for conducting a plurality of cinematographic strips between said members, a distributor for applying cement between the strips, and means for loosely suspending the distributor in juxtaposition to the strips.

33. Cinematographic apparatus comprising a plate for distributing a liquid to a cinematographic strip, mechanism for feeding a strip past the plate, means for positioning the plate with the lower end in yielding contact with the strip, and means for subsequently pressing said strip against another strip with the sprocket holes of the two strips in accurate registry.

34. Cinematographic apparatus comprising a plate for distributing a liquid to a cinematographic strip, mechanism for feeding a strip past the plate, means for positioning the plate with the lower end in yielding contact with the strip, said means including a bearing arranged to permit automatic alignment of said lower end with respect to the strip, and means for subsequently pressing said strip against another strip with the sprocket holes of the two strips in accurate registry.

35. Cinematographic apparatus comprising a plate for distributing a liquid to a cinematographic strip, mechanism for feeding a strip past the plate, means for positioning the plate with the lower end in yielding contact with the strip, said means including a spring urging the plate against the strip, and means for subsequently pressing said strip against another strip with the sprocket holes of the two strips in accurate registry.

36. Cinematographic apparatus comprising a plate for distributing a liquid to a cinematographic strip, mechanism for feeding a strip past the plate, means for positioning the plate with the lower end in yielding contact with the strip, said means including a spring urging the plate against the strip and a bearing arranged to permit automatic alignment of said lower end with respect to the strip, and means for subsequently pressing said strip against another strip with the sprocket holes of the two strips in accurate registry.

37. Cinematographic apparatus comprising a pair of juxtaposed rolls, means for feeding cinematographic strips upon said rolls respectively and thence into contact while on the rolls, and pins alternately disposed on said rolls for accurately registering the sprocket holes of the strips.

38. Cinematographic apparatus comprising a pair of rollers journaled in substantially tangential relationship, each of the rollers having peripheral pins positioned to enter the sprocket holes of a cinematographic strip passing between the rollers and each of the rollers having series of peripheral recesses shaped to receive the projecting ends of said pins on the other roller.

39. Cinematographic apparatus comprising a pair of rollers journaled in substantially tangential relationship, the rollers having peripheral series of pins positioned respectively to enter alternate holes of cinematographic strips passing between the rollers, and each roller having recesses to receive the projecting ends of the pins on the other roller.

40. Cinematographic apparatus comprising mechanism for feeding two cinematographic strips convergently into juxtaposition and means for conjointly registering the strips and pressing them together, said means including a pair of substantially tangential rollers arranged at opposite sides of said strips and having registering pins arranged to enter the sprocket holes of the strips.

41. Apparatus for bringing cinematographic strips into registered juxtaposition comprising a pair of rollers arranged in substantially tangential juxtaposition, sprocket hole teeth on the peripheries of said rollers, and means for feeding said strips respectively upon said rollers in advance of their tangential portions with their sprocket holes accurately positioned by said teeth, whereby the strips are brought together in accurate registration by virtue of said rollers being geared thereto.

42. The method of bringing cinematographic strips into registered juxtaposition which comprises fitting the strips respectively upon two series of registering pins spaced at like intervals potentially to register the strips and then pressing the films together with their sprocket holes in registry.

43. The method of bringing cinematographic strips into registered juxtaposition which comprises continuously feeding the strips respectively upon endless series of registering pins traveling in closed orbits which lie in the same plane and are approximately tangential to each other and continuously pressing the strips together at said tangential portions of their orbits with their sprocket holes in registry.

44. Apparatus for bringing cinematographic strips into registered juxtaposition comprising two registering devices having series of registering pins spaced at like intervals to receive the respective strips in like position thereon, whereby the strips may be pressed together in accurate registration.

45. Apparatus for bringing cinematographic strips into registered juxtaposition comprising two registering devices having series of registering pins spaced at like intervals to receive the respective strips in like position thereon, and means for accurately registering the strips when pressed together by said devices.

46. Apparatus for bringing cinematographic strips into registered juxtaposition comprising two registering devices having endless series of registering pins traveling in closed orbits which lie in the same plane and are approximately tangential to each other, the pins being shaped and positioned to cause strips traveling over said devices to be accurately registered at the tangential portions of said orbits.

47. Apparatus for bringing cinematographic strips into registered juxtaposition comprising two registering devices having endless series of registering pins traveling in closed orbits which lie in the same plane and are approximately tangential to each other, and means for continuously feeding said strips respectively upon said series in advance of the tangential portions of the orbits, the pins being shaped and positioned accurately to register the strips as they contact at said tangential portions.

48. Apparatus for bringing cinematographic strips into registered juxtaposition comprising two registering devices having endless series of registering pins traveling in closed orbits which lie in the same plane and are approximately tangential to each other, the pins being spaced at like intervals, whereby strips may be positioned in potential registry upon the respective series and then fed continuously into registered contact at said tangential portions of the orbits.

49. Apparatus for bringing cinematographic strips into registered contact which comprises a curved surface against which previously spaced strips are brought together in superposition, and means including teeth moved by the strips for accurately registering them at the instant of contact.

50. Apparatus for bringing cinematographic strips into registered contact which comprises a drum rotated by the strips as they pass the same in superposition, and registering pins for accurately positioning said strips relatively to each other as they move into contact, said strips being spaced apart prior to their engagement at the surface of said drum.

51. Apparatus for bringing cinematographic strips into registered contact which comprises a drum rotated by the strips as they pass the same in superposition, and registering pins on said drum for accurately positioning said strips relatively to each other as they move into contact, said strips being spaced apart prior to their engagement at the surface of said drum.

52. Apparatus of the character described which comprises means providing a curved surface, means for advancing two cinematographic strips convergently into contact at said surface, teeth moved by the strips for accurately registering the strips at the instant of contact, means for wetting one strip prior to said contact, and means for pressing the strips together as contact is effected.

53. Apparatus of the character described comprising means for bringing a plurality of cinematographic strips having sprocket holes therein into contact with said sprocket holes in full longitudinal registration with each other including means adapted to enter said sprocket holes and wholly controlled by said cinematographic strips, and means for imparting pressure to said strips cooperating to press the same together exerting pressure on the zones thereof of said sprocket holes at the instants when the latter are in such full registration.

54. The method of treating cinematographic strips which comprises continuously feeding the strip, pumping liquid upon said strip in synchronism with the feeding operation to apply a uniformly thin coating of liquid upon the strip and then pressing the strip against another strip.

55. The method of treating cinematographic strips which comprises continuously feeding the strip, pumping liquid upon said strip in synchronism with the feeding operation, distributing the liquid transversely of the strip to produce a thin uniform coating throughout the entire width of the strip and then pressing the strip against another strip.

Signed by us at Boston, Massachusetts, this 10th day of September, 1921.

LEONARD T. TROLAND.
JOSEPH A. BALL.